United States Patent [19]

Marukawa et al.

[11] 4,292,073

[45] Sep. 29, 1981

[54] STEEL MAKING PROCESS

[75] Inventors: Katsukiyo Marukawa; Syoji Anezaki, both of Ibaraki; Seiichi Masuda, Nishinomiya, all of Japan

[73] Assignee: Sumitomo Metal Industries, Inc., Osaka, Japan

[21] Appl. No.: 154,216

[22] Filed: May 29, 1980

[30] Foreign Application Priority Data

Jul. 3, 1979 [JP] Japan ................................. 54-84522

[51] Int. Cl.$^3$ ........................... C21C 5/32; C21C 5/34
[52] U.S. Cl. ........................................ 75/60; 75/51; 75/59
[58] Field of Search ................................ 75/51, 59, 60

[56] References Cited

U.S. PATENT DOCUMENTS 3,854,932 12/1974 Bishop ..................................... 75/60
4,089,677 5/1978 Spenceley ............................... 75/51

Primary Examiner—P. D. Rosenberg
Attorney, Agent, or Firm—Stevens, Davis, Miller & Mosher

[57] ABSTRACT

A process for making carbon steel and low-alloy steel in a basic oxygen furnace is disclosed, which comprises preparing a molten metal suitable for producing the steel in said basic oxygen furnace, carrying out the top-blowing of oxygen gas and bottom-blowing of carbon dioxide gas and then tapping the resulting molten steel. The top-blowing oxygen gas is injected through a lance onto the molten metal at an outlet velocity of Mach 0.8–2.0.

3 Claims, 2 Drawing Figures

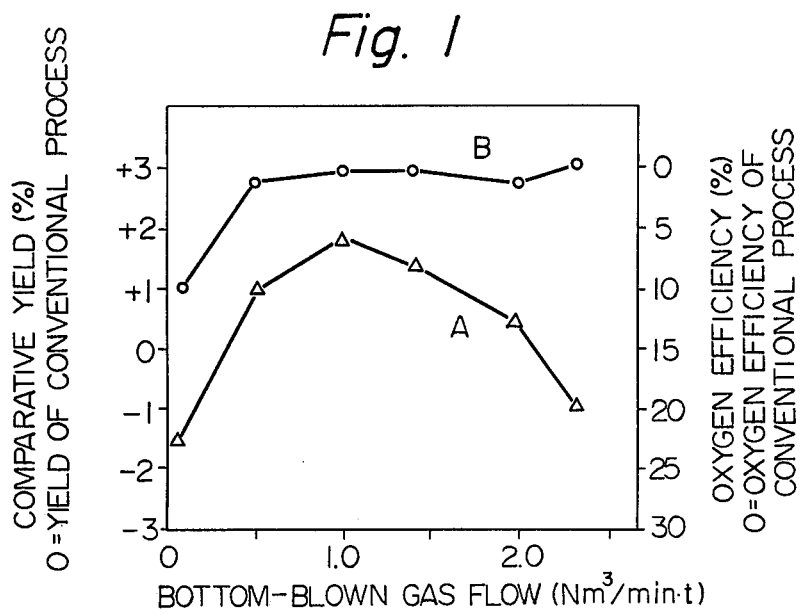
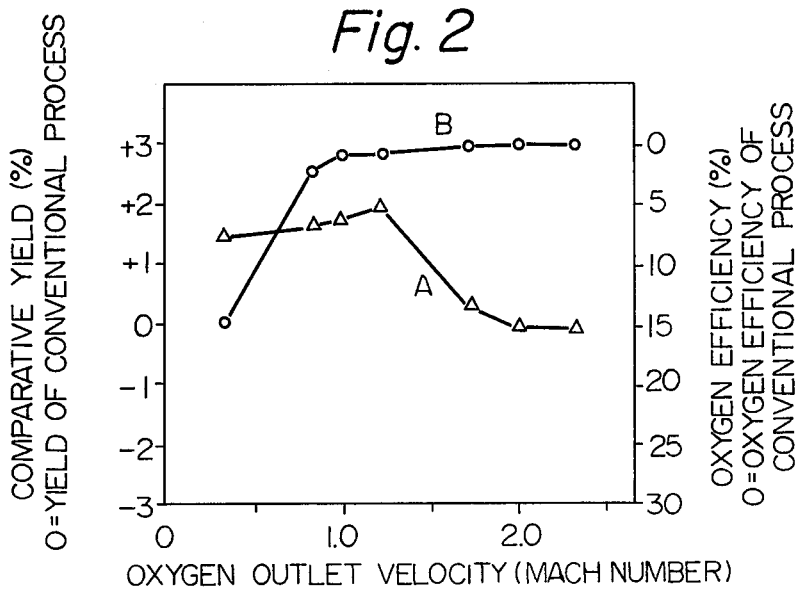

STEEL MAKING PROCESS

FIELD OF THE INVENTION

This invention relates to a steel making process for the production of carbon steels and low-alloy steels with a bottom-blowing basic oxygen furnace, in which carbon dioxide is blown underneath the bath surface so as to promote the agitation of the molten metal in an oxygen steel making process.

BACKGROUND OF THE INVENTION

The oxygen steel making process is one of the most widely employed steel making processes. However, it is also known in the art that, since the rate of decarburization decreases in the final stage of blowing in this process, the agitation of the molten steel is lessened and the oxidation of iron is promoted resulting in decrease in iron yield. In addition, it is also known that the presence of temperature difference between the molten steel and molten slag occurring due to insufficient agitation between them, causes the dephosphorizing reaction to diminish.

For the purpose of compensating for the decrease in agitation in the final stage of top blowing to avoid iron loss due to the oxidation thereof and to prevent the diminishing of the dephosphorizing reaction, "combined blowing" has recently been proposed—that is, the blowing of an inert gas into the melt underneath the bath surface in combination with top-blowing in the oxygen steel making process.

According to this combined blowing process, the oxidization of iron is suppressed and the iron yield is improved. The dephosphorizing and desulfurizing reactions are also promoted. However, in the conventional combined blowing process, the oxygen is blown into the steel melt through the conventional lance in a supersonic oxygen gas jet. Therefore, the temperature at the impinging surface between the oxygen and molten steel, goes up to 2000° C. or more. Therefore, iron loss due to evaporation (hereinafter referred to as "fumeloss") is still significant. In addition, the problems of spitting of fine iron particles after firing and the slopping of slag and molten steel still remain unsolved. Therefore, even in the combined blowing mixing, a remarkable increase in tapping yield cannot be expected.

This is because, according to the conventional oxygen steel process, the Lavel-type nozzle is used as a lance and an oxygen jet injected at a supersonic rate of higher than Mach 2 but up to Mach 2.5 so that the disadvantages mentioned above is inevitable. In order to avoid such disadvantages controlling the decarburization rate and the slag conditions during blowing has been tried. However, it is difficult to control these factors during operation and, in fact, such improved results as expected could not be obtained.

BRIEF DESCRIPTION OF THE INVENTION

The object of this invention is to provide a process for producing carbon steels and low-alloy steels with an improved tapping yield in the bottom-blowing BOF.

Thus, this invention resides in a process for making carbon steel and low-alloy steel in a basic oxygen furnace, which comprises preparing a molten metal suitable for producing the steel in said basic oxygen furnace, carrying out the top-blowing of oxygen gas and bottom-blowing of carbon dioxide gas and then tapping the resulting molten steel, characterized in that the top-blowing oxygen is injected through a lance onto the molten metal at an outlet velocity of Mach 0.8–2.0, preferably Mach 0.8–1.5. Preferably, the bottom-blowing carbon dioxide is blown into the molten metal in an amount of 0.3–2.0 Nm$^3$/min per ton of molten steel.

According to this invention, since the bottom-blowing is employed to promote the agitation of the molten metal, the blowing rate of the oxygen from the top need be just enough to pass through the layer of slag to impinge onto the molten metal, and it is possible to improve the tapping yield without reducing the oxygen efficiency.

The effect of this invention which will be described in detail in the following working examples is that the tapping yield is improved and simultaneously the advantages of the combined blowing can also be obtained. In addition, the pressure of the top-blowing is rather mild, making this process more economical.

BRIEF DESCRIPTION OF THE DRAWINGS

FIG. 1 shows experimental results obtained when the flow rate of carbon dioxide was varied as indicated at an outlet velocity of oxygen of Mach 1, and FIG. 2 shows experimental results obtained when the outlet velocity of oxygen was varied as indicated at a carbon dioxide flow rate of 1 Nm$^3$/min per ton.

PREFERRED EMBODIMENT OF THE INVENTION

A preferred embodiment of this invention will be described.

When the conventional oxygen steel making furnace, i.e. oxygen top-blowing converter is employed, at least one nozzle is provided in the bottom or the side wall of the converter through which carbon dioxide gas is blown into the molten metal. This bottom-blown gas is injected into the molten metal in an amount of 0.1–2.0 Nm$^3$/min per ton of molten metal, resulting in efficient agitation of the melt.

In general, the less the flow rate the less the effect of oxygen. This leads to much oxidation of iron, resulting in decrease in tapping yield. On the other hand, the greater the flow rate, the more slopping. This leads to a little decrease in tapping yield. Thus, it is preferable to adjust the flow rate of the bottom-blowing to the optimum one depending on the proceeding of the refining reaction.

In addition, with respect to the relation between the outlet velocity of the top-blowing oxygen passing through the lance and the flow rate of the bottom-blowing gas, it is advisable to reduce the bottom-blowing gas flow rate when the outlet velocity of the top-blowing gas is large, and, on the other hand, to increase the bottom-blowing gas blow rate when the outlet velocity is small. This is advantageous to promote the refining effect of the converter.

Regarding the flow rate of the top-blowing gas, it can be said that if the conventional supersonic jet oxygen top-blowing is employed, as mentioned hereinbefore, much fume-loss and slopping will result with a relatively great reduction in tapping yield. On the other hand, if the velocity of the oxygen jet is too low, the oxygen effect reduces markedly. According to this invention, the velocity of the top-blowing oxygen is restricted to Mach 0.8–2.0, preferably Mach 0.8–1.5. If the velocity in this range is employed, the piping for passing oxygen may be of a grade for low pressures, e.g.

3–5 kg/cm². In addition, the nozzle of the oxygen lance may be of the straight type in case of a subsonic jet, and of the Lavel type in case of a supersonic jet.

In practicing this invention, the relation between the flow rate of the top-blowing oxygen gas and that of the bottom-blowing gas may be optimized depending on the converter used.

EXAMPLE

In this example, an oxygen top-blowing converter with the capacity of 2 tons was used to produce carbon steel. Two nozzles 6 mm in diamiter were provided in the bottom of the converter. Carbon dioxide gas was injected into the molten metal through the nozzles. The top-blowing oxygen was supplied through the straight type nozzles and Laver type nozzles.

In one series of experiments, the flow rate of the bottom blowing carbon dioxide gas was varied. In another series of experiments, the outlet velocity of the top-blowing oxygen was varied.

Other experimental conditions were:

molten iron: 2000 kg, 1380° C., 4.20% C, 0.52% Si, 0.61% Mn, 0.121% P, 0.020% S
scrap iron: 360 kg
oxygen flow rate: 6 Nm³/min
oxygen pressure before passing into the lance: 5 kg/cm²
distance between the lance top and the bath surface: 300 mm
bottom-blowing gas flow rate: 0.1–2.3 Nm³/min per ton
oxygen jet velocity: Mach 0.3–2.3
blowing period: 18.6 minutes Under these conditions, the tapping yield and the oxygen efficiency were determined. The results are summarised in FIGS. 1 and 2. FIG. 1 shows the results obtained when the flow rate of carbon dioxide was varied as indicated with an outlet velocity of oxygen of Mach 1. FIG. 2 shows the results obtained when the outlet velocity of oxygen was varied as indicated at a carbon dioxide flow rate of 1 Nm³/min per ton.

The data platted in FIGS. 1 and 2 are shown in comparison with those obtained in the conventional oxygen top-blowing process, in which the oxygen is blown on the molten metal at Mach 2.5 and no bottom-blowing is employed.

From the results shown in FIG. 1 it is noted that improved comparative tapping yield (shown by graph A) and comparative oxygen efficiency (shown by graph B) in comparison with those of the conventional process were obtained when a flow rate of carbon dioxide of 0.3–2.0 Nm³/min per ton was employed at an outlet velocity of oxygen of Mach 1. It is also noted from FIG. 2 that improved tapping yield (shown by graph A) and oxygen efficiency (shown by graph B) in comparison with those obtained in the conventional process were obtained when an outlet velocity of oxygen of Mach 0.8–2.0, preferably Mach 0.8–1.5 was employed at a carbon dioxide flow rate of 1 Nm³/min per ton.

As is apparent from the foregoing, this invention is applicable to produce carbon steels (rimmed steels, killed steels), and low-alloy steels, resulting in improved refining efficiency and yield, and low construction cost.

What is claimed is:

1. A process for making carbon steel and low-alloy steel in a basic oxygen furnace, which comprises preparing a molten suitable for producing the steel in said basic oxygen furnace, carrying out the top-blowing of oxygen gas and bottom-blowing of carbon dioxide gas and then tapping the resulting molten steel, characterized in that the top-blowing oxygen is injected through a lance onto the molten metal at an outlet velocity of Mach 0.8–2.0.

2. A process as defined in claim 1, in which the outlet velocity of the top-blowing oxygen is Mach 0.8–1.5.

3. A process as defined in claim 1 or 2, in which the bottom-blowing carbon dioxide is blown into the molten metal in an amount of 0.3–2.0 Nm³/min per ton of molten steel.

* * * * *

UNITED STATES PATENT AND TRADEMARK OFFICE
CERTIFICATE OF CORRECTION

PATENT NO. : 4,292,073
DATED : September 29, 1981
INVENTOR(S) : Marukawa, Katsukiyo; Anezaki, Syoji and Masuda, Seiichi.

It is certified that error appears in the above—identified patent and that said Letters Patent is hereby corrected as shown below:

The name of the assignee should read as follows:

"SUMITOMO METAL INDUSTRIES, LTD.", not

"SUMITOMO METAL INDUSTRIES, INC.".

Claim 1, line 3, after "molten" please insert -- metal --.

Signed and Sealed this

Nineteenth Day of January 1982

[SEAL]

Attest:

GERALD J. MOSSINGHOFF

Attesting Officer

Commissioner of Patents and Trademarks